Jan. 18, 1944.  W. C. LUBAHN  2,339,494
TRAVELING TRAY CONVEYER
Filed Dec. 1, 1941  3 Sheets-Sheet 1
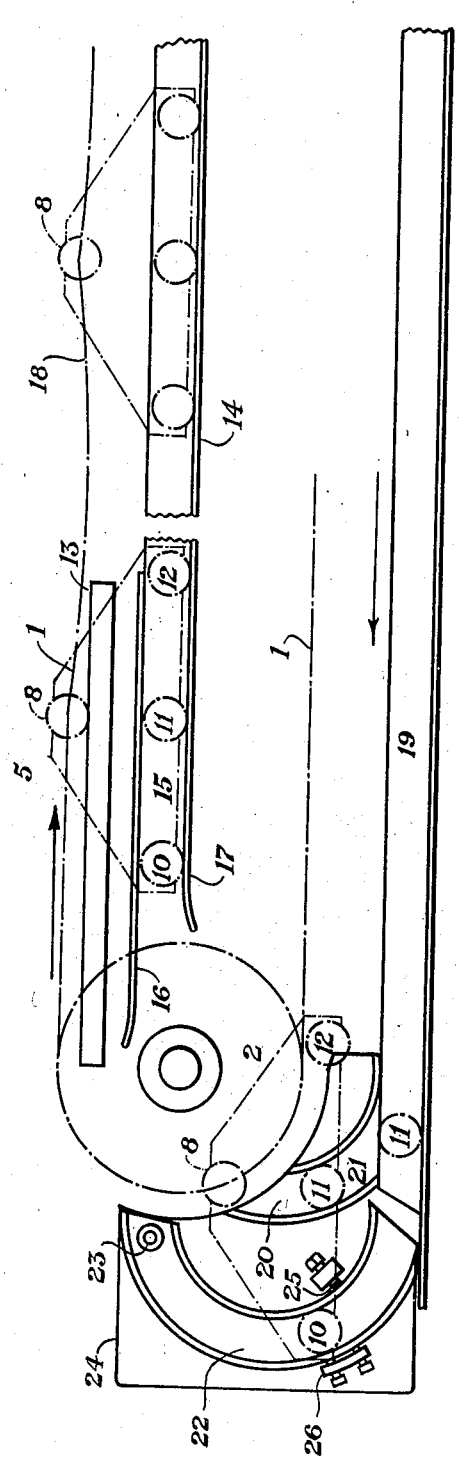
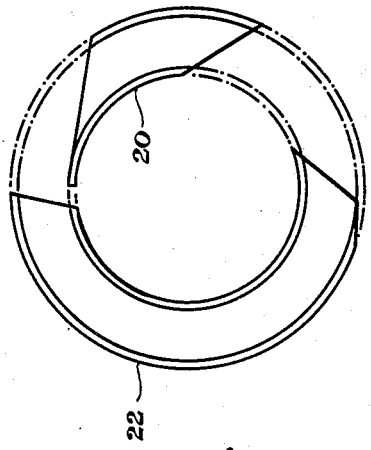
Fig. 6
Fig. 1
INVENTOR
WILLIAM C. LUBAHN
BY Jan. 18, 1944.   W. C. LUBAHN   2,339,494
TRAVELING TRAY CONVEYER
Filed Dec. 1, 1941   3 Sheets-Sheet 2

INVENTOR
WILLIAM C. LUBAHN
BY
Attorney

Jan. 18, 1944.  W. C. LUBAHN  2,339,494
TRAVELING TRAY CONVEYER
Filed Dec. 1, 1941  3 Sheets-Sheet 3

INVENTOR
WILLIAM C. LUBAHN
BY George B. Willcox
ATTORNEY.

Patented Jan. 18, 1944

2,339,494

UNITED STATES PATENT OFFICE 2,339,494

TRAVELING TRAY CONVEYER

William C. Lubahn, Saginaw, Mich., assignor to Baker Perkins Inc., Saginaw, Mich., a corporation of New York Application December 1, 1941, Serial No. 421,093

1 Claim. (Cl. 198—137)

My invention relates to improvements in traveling tray conveyers for bakers' ovens and the like, wherein two endless chains travel around sprocket wheels located at each side of a chamber. Suspended pivotally from the two chains are trays with their bottoms lower than the chains. In operation such a conveyer is caused to halt temporarily as each tray arrives at a charging station where it is loaded or unloaded in its regular order.

An important object of this invention is to provide effective and simplified means that shall keep the bottoms of the trays horizontal and stabilized throughout every portion of their circuit of travel around the conveyer, even though the trays may happen to be loaded out of balance. Another object is to provide such stabilizing devices arranged so that the conveyer chains shall serve as their own take-up devices to compensate for variations in length caused by temperature changes or wear.

A further object is to provide a simplified and inexpensive structure for certain curved guides or channels which are employed in my improvement.

With the foregoing and certain other objects in view which will appear later in the specification, my invention comprises the devices described and claimed and the equivalents thereof.

Earlier practice has been to install a track of channel cross-section and curved to the arc of a circle adjacent each sprocket wheel, and to provide a roller on an end wall of each tray at its bottom and on the middle center line of the tray to follow the track. Each tray was thereby kept approximately stabilized while receiving its load, yet such curved tracks did not stabilize the tray satisfactorily at the place where the roller entered the track at its bottom end, nor at a place just after the tray left the charging station, nor while passing around the upper front portion of the sprocket wheels toward the top run of the conveyer, nor on the straight runs.

My invention prevents even slight tilting movements of the tray and gives smooth operation at every place around the tray cycle. It consists of better and more effective tray stabilizing means and comprises a novel combination of curved guides and straight guides and a certain arrangement of cooperating rollers on the end members of the trays.

The principle of my invention and the mode of applying it will now be explained and distinguished from stabilizing devices heretofore used in bakers' ovens.

Fig. 1 is a side view of the head end or loading portion of the left hand side of a traveling tray conveyer equipped with my improved system of suspended trays and guideways, trays in various positions thereon being indicated diagrammatically.

Fig. 6 is a face view of an annular channel ring from which the curved guides may be manufactured.

The drawings show a preferred embodiment of my invention. Each conveyer chain 1 passes over a front and a rear sprocket wheel 2, 3 traveling close to a side wall 4 of an oven in the usual manner, being driven by any suitable power means (not shown) which may be applied to the sprocket wheels.

Figure 4:
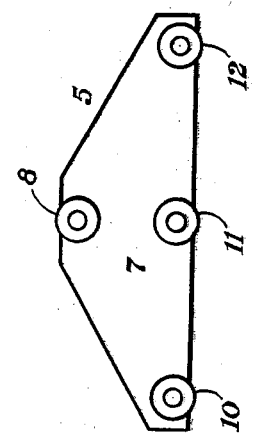
Fig. 4 is an end view of a suspended tray showing thereon my improved arrangement of guiding rollers.
Figure 3:
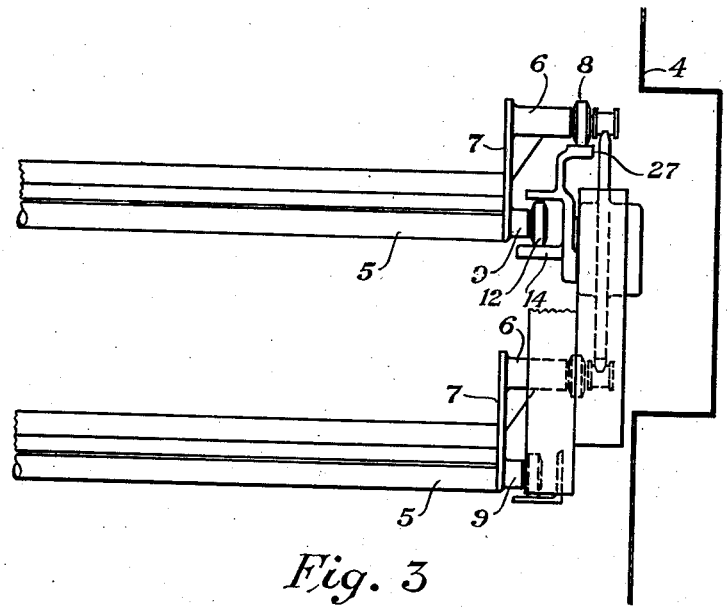
Fig. 3 is a fragmentary sectional detail on line 3—3 of Fig. 2.
Figure 5:
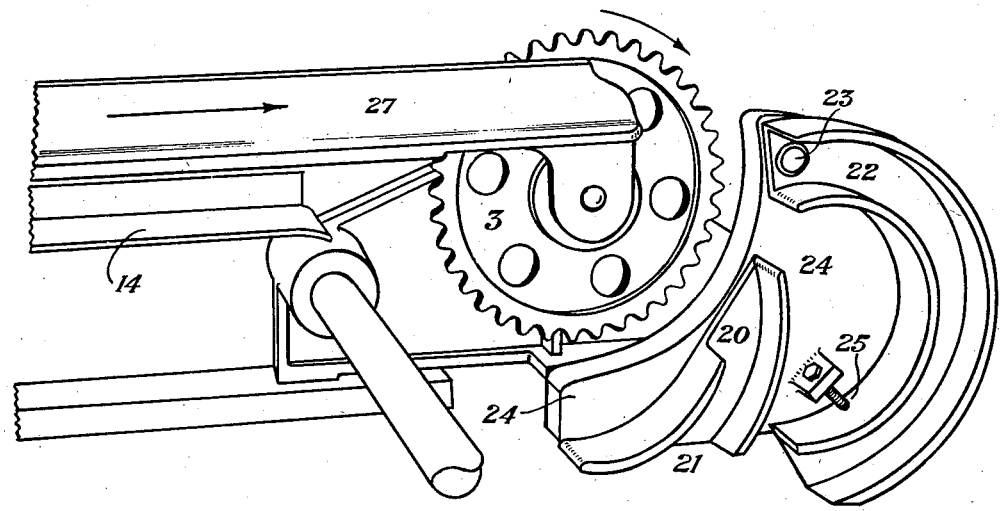
Fig. 5 is a perspective view of certain arcuate guides arranged according to my invention.

Trays designated in general by numeral 5 extend crosswise of the oven, being suspended from the chains 1 by means of gudgeons 6, Fig. 3, that project from the end walls 7 of the trays and through holes in the chain links. Each gudgeon 6 has a freely rotatable roller 8. At the bottom part of at least one of the end walls 7 of the tray are additional gudgeons 9 with three lower rollers 10, 11, 12 arranged in a row as shown in Fig. 4, one roller 11 being at the middle of the bottom portion of the end 7 of the tray, its axis being directly below the axis of roller 8. The other two rollers 10, 12, which constitute a novel feature of my improvement are mounted near the corners of the tray. Upper roller 8 does not revolve in the same vertical plane as 10, 11, 12, but is offset outwardly therefrom, as shown in Fig. 3.

Short horizontal tracks, 13, Fig. 1, are arranged alongside the upper run of the conveyer chain 1 and overlap the front sprocket wheels 2.

The short track 13 supports and guides roller 8 as it leaves sprocket 2 in the direction of the arrow.

At the end of 13 the roller 8 runs off so that the weight of tray and chain, which has just been suspended from roller 8, shifts from roller 8 onto rollers 10 and 12 that now run on a main track 14 that extends parallel with chain 1.

The first portion 15 of track 14 is channel shaped. Its top flange 16 is extended to overlap the side of sprocket 2 and at its end is faired upwardly. Bottom flange 17 commences about half the width of a tray 5 from the center of sprocket 2 and is faired downwardly to smoothly receive roller 12 as the tray travels in the direction of the arrow.

As tray 5 moves along track 14, its rollers 10 and 12 are at first both confined between the upper flange 16 and lower flange 17, thereby preventing the tray from tilting while it goes from sprocket wheel 2 onto tracks 13 and 14. It may be observed at this point that in recent times wider trays have been adopted for use in bakers' ovens, being now about twenty to thirty inches wide, with suspension height of only about five inches. Such wide trays with shallow suspension have a tendency to tilt altogether too easily to be properly stabilized by only a single top roller 8 and a single bottom roller 11 with such guiding arrangements as heretofore have been used, which undesirable performance has long persisted in traveling tray conveyers of the type here considered.

Eccentric or one-sided loading of such a wide suspended tray tends to slant it sharply away from the correct horizontal. Malformed loaves, cakes, etc., may be produced by even a small degree of tilting. Moreover, jolts often damage such goods caused by a tilted tray running into obstructions.

My arrangement of track 14 and rollers 10 and 12 gives the trays the required stability on the straight run because they travel like four-wheeled vehicles on 14, and obviously have no tendency to tilt.

A short length of chain, 18, connects successive trays on the straight run, and its catenary sag creates endwise pull in the chains sufficient to act in place of the customary mechanical take-up device, which, with my improvement has become unnecessary, thereby reducing the cost of a conveyer.

When roller 8 leaves short track 13 the weight of tray 5 plus the portion 18 of conveyer chain 1 attached to it is then carried, as on a rolling vehicle, by the rollers 10, 12 on track 14. The trays are thus thoroughly stabilized while in transit along the upper run.

Likewise, when the trays are returning along the lower run they operate like stabilized non-tiltable wheeled vehicles on a bottom main rail 19.

Having described the stabilizing action of the tray rollers 10, 12 when the tray is on the straight guide members 13, 14, 19, I shall now refer to Fig. 1 and point out the structural features comprising my improved system of curved guideways which stabilize the trays while they pass upwardly around the front half of the forward sprocket wheels 2.

Assuming the lower run to be moving to the left, the axis of upper roller 8 of each tray will of course follow the approximate pitch circle of sprocket 2. At the top of the pitch circle, 8 leaves the sprocket and transfers onto the above described short horizontal track 13 at the beginning of the upper run. Meanwhile, the lower middle roller 11 enters the lower intake end of an arcuate guide member or channel 20 when the tray is lifted by its gudgeon 6 and starts its upward travel around sprocket wheel 2.

Channel 20, per se, has been used heretofore. Its upper part does assist in keeping the trays from swaying back and forth, that is, to right and left, Fig. 1, while passing around the wheel 2. But the channel 20 in practice failed to accomplish the complete degree of stabilization which is required in modern practice and is attained by improved arcuate guide features of my invention.

Heretofore, when upper roller 8 commenced to lift and travel up and around the pitch circle, and when the middle bottom roller 11 was about to enter the intake end 21 of arcuate channel 20, considerable swaying of the tray 5 to the right and left occurred. Such lack of stabilization, at 21, will be apparent upon noting the angular and rather open position of the channel 20 at its mouth. At points higher up on 20 the more nearly vertical position of the channel restricts such swaying.

It is an object of my invention to stabilize the trays at every point of their circuit and I have overcome the looseness and instability at 21 by the means which will now be described.

A second arcuate guideway 22 is movably mount in advance of sprocket wheel 2.

For convenience I prefer to pivot 22 at its top, as indicated at 23 to a fixed support 24, giving it a normal tendency to swing toward sprocket wheel 2 by gravity. The permissible movement of the guideway 22 may be limited by inner and outer adjustable abutments 25, 26 supported at opposite sides thereof.

The mode of operation of guideway 22 and its advantages will now be pointed out. Assuming that tray 5 has just completed the lower run toward the left, Fig. 1, and that the roller 8 has arrived at the vertical diameter of sprocket wheel 2, and middle roller 11 has just engaged the under side of the upper flange of 20 at the entrance 21 of channel 20. The advance roller 10 is then passing underneath the upper flange at the lower end of the second arcuate guideway 22. The tray 5 is thereby kept from any incipient tilting or swinging movement at the moment when the three bottom rollers commence to rise from the track 19 on which they have been rolling during the return run. Advance roller 10 cooperates with upper roller 8 to stabilize the tray until middle roller 11 has advanced far enough into its channel 20 to help keep the tray from tilting.

It is to be observed that without the second arcuate guideway 22 and without the advance roller 10, the middle roller 11 would not effectually prevent the tray from tilting until after it had come well into its curved channel 20.

The second guideway 22 serves also to compensate for the effects of unavoidable track clearances or of slack in the bearing of the tray roller 10. Guideway 22 is kept continually in a stage of being yieldingly urged toward the sprocket wheel 2, and the roller 10 is continually urged toward the right, Fig. 1. Thus the lower middle roller 11 is kept in rolling contact with the right hand flange of its channel 20. Consequently, there will be no undesirable play at the bearing of roller 10, nor between its rim and the flanges of its channel 22.

Figure 2:
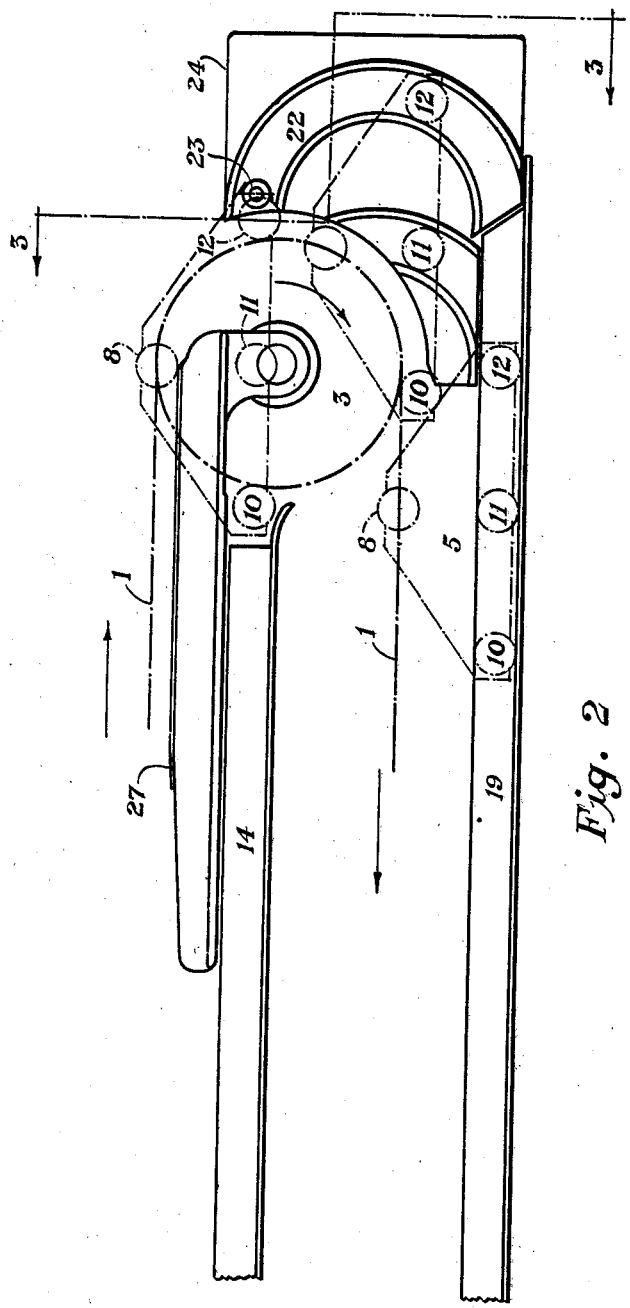
Fig. 2 is a similar view of the tail end.

At the tail end of the conveyer, Fig. 2, the operation of causing the tray 5 to pass onto, around, and away from sprocket wheel 3 is substantially the same as has been described at the head end Fig. 1, but in reverse order. The arrangement shown in Fig. 1 is the reverse of that shown in Fig. 2. The arrangement in Fig. 1 may be termed right-hand, that shown in Fig. 2 left-hand. In all other respects the means for keeping the trays level and free from jars at every place in their cycle of travel is the same at both ends of the conveyer where it goes around the sprockets. Moreover, the trays are as effectually stabilized when the conveyer is running in reverse as it is when traveling in the direction shown by the arrows in Figs. 1 and 2. In Fig. 2 the lower rollers 10, 12 are running on main track 14 until the upper tray roller 8 commences to ride upon a short track 27 that delivers 8 to sprocket 3 at the top diameter. As this occurs, the bottom roller 10 leaves track 14 and bottom roller 12 enters the upper end of guideway 22.

The tray then proceeds around the bottom of sprocket 3, being guided by the arcuate guideways 20 and 22 in the same manner as has been described for the head end, Fig. 1. The rollers 10, 12 then run onto the bottom main rail 19 and proceed on it to the left as when they traveled on the main track 14.

From the foregoing it will be seen that there is no place in the entire cycle of the tray around the conveyer where any appreciable tilting of the tray is permitted. In other words the tray is fully stabilized at every point in its travel.

My improved structure for the curved guides is shown in Fig. 6, where 20 and 22 represent the corersponding guides in the other views. The broken lines completing the circle in Fig. 6 indicate the material that can be cut from a channel shaped ring of metal in order to produce both arcuate guides. This device considerably reduces the cost of manufacture of a set of guides and insures that the curvature will be exactly the same in guide 20 and guide 22.

The second arcuate guideway 22 has been shown and described as pivoted at 23 in order to give it a natural tendency to urge the tray toward the right as it travels up the front face of the sprocket wheel 2. However, it is to be understood that the specific pivoting at 23 is only one means of producing the desired urging of guideway 22.

Having thus described my invention, what I claim and desire to secure by Letters Patent is:

In a traveling tray conveyer for bake ovens and the like comprising parallel chains mounted on sprocket wheels, trays beneath said chains and secured thereto, rollers on an end of each tray adjacent the advance and rearward bottom corners thereof; an upper and a lower main track extending parallel with the upper and lower runs of said chain respectively, being spaced therefrom a distance substantially equal to the radius of the sprocket wheel, a middle upper roller on each tray end and secured to a link of said chain, said corner rollers constituting vehicle wheels supporting said trays and stabilizing the same against tilting movements while traversing said main tracks and also supporting freely suspended portions of the chain and thereby causing the chain to operate as its own take-up device; an arcuate guideway adjacent each sprocket wheel and receiving lower middle rollers that are mounted on the ends of said trays; a second arcuate guideway adapted to receive said leading corner roller being pivotally secured adjacent the sprocket wheel; the said arrangement of the inner and outer curved guideway assemblies at the ends of the conveyer being alike, one right-hand, the other left-hand, and together constituting means for effectively stabilizing the conveyer trays and the goods thereon against undesirable jars and tilting movements throughout every part of the cycle of travel when the conveyer is running in a given direction, or in reverse.

WILLIAM C. LUBAHN.